3,398,360
MAGNETIC BODY DETECTOR SENSITIVE ONLY
TO MAGNETIC FIELD VARIATIONS WITHIN A
PREDETERMINED RANGE
Joseph L. Behr, Affton, and Niels C. Andersen, St. Louis,
Mo., assignors to Sperry Rand Corporation, New York,
N.Y., a corporation of Delaware
Filed May 20, 1964, Ser. No. 368,964
12 Claims. (Cl. 324—43)

ABSTRACT OF THE DISCLOSURE

Coils are spaced apart but coact to define a space, a circuit connects a sensing magnetometer to those coils and coacts with that sensing magnetometer and with those coils to provide a drift-free dynamic and continuous nulling, within that space, of the earth's magnetic field and of frequencies below a predetermined frequency, a detecting magnetometer is disposed within that space, a second circuit connects that detecting magnetometer to an indicator, and that second circuit attenuates signals having frequencies above a second and higher predetermined frequency, so the detecting magnetometer can supply signals to the indicator which truly indicate the presence of large magnetic bodies.

---

This invention relates to improvements in control systems. More particularly, this invention relates to improvements in control systems which can detect the presence of magnetic objects that cause appreciable variations in the earth's magnetic field.

It is, therefore, an object of the present invention to provide an improved control system which can detect the presence of magnetic objects that cause appreciable variations in the earth's magnetic field.

It is frequently desirable to detect the presence of magnetic objects that cause appreciable variations in the earth's magnetic field; and, in recognition of that fact, control systems have been developed to detect the presence of such magnetic objects. In some of those control systems a detecting magnetometer is mounted in gimbals and those gimbals, in turn, are mounted within an airplane or other vehicle. Those gimbals make it possible for the axis of that magnetometer to be held parallel to the flux lines in the earth's magnetic field; and, where that axis is so held, that magnetometer and the circuit associated therewith can provide an output signal which varies as that magnetometer senses appreciable changes in the earth's magnetic field. Such control systems are workable; but they are bulky because of the gear trains, servo motors, and the like which are needed to keep the axis of the detecting magnetometer parallel to the flux lines in the earth's magnetic field. Further, those control systems can not compensate for sudden changes in the direction of movement of the airplane or other vehicle, because of the inertia of the gear trains, servo motors, and the like therein. Moreover, those control systems are inherently inaccurate because of the unavoidable backlash in the gear trains therein and because of the unavoidable variations in machining tolerances in the gimbals and in those gear trains. Consequently, control systems wherein a detecting magnetometer is mounted in gimbals and wherein those gimbals, in turn, are mounted within an airplane or other vehicle are not satisfactory. The present invention provides a truly satisfactory control system by making it possible to mount the detecting magnetometer thereof fixedly within the airplane or other vehicle, and thereby obviating all need of gimbals, gear trains, servo motors, and the like. Such a control system can be compact, can compensate for sudden changes in the direction of movement of the airplane or other vehicle, and is free of inaccuracies due to backlash or variations in machining tolerances. It is, therefore, an object of the present invention to provide a control system which can detect the presence of magnetic objects that cause appreciable variations in the earth's magnetic field and which has the detecting magnetometer thereof fixedly mounted within the airplane or other vehicle.

The present invention makes it possible to fixedly mount the detecting magnetometer within the airplane or other vehicle by establishing and maintaining a magnetic field adjacent that magnetometer which effectively nulls the earth's magnetic field and all nearby man-made magnetic fields, and by using a circuit which responds only to predetermined changes in the magnetic field adjacent that magnetometer. Specifically, the circuit provided by the present invention does not respond to slow changes in the magnetic field adjacent the detecting magnetometer and also does not respond to rapid changes in the magnetic field adjacent that magnetometer. Instead, that circuit responds only to those changes in the magnetic field adjacent the detecting magnetometer which occur at a rate which corresponds to the rate at which that magnetic field changes when the airplane or other vehicle passes over or near a magnetic object that causes an appreciable variation in the earth's magnetic field. It is, therefore, an object of the present invention to establish and maintain a nulling magnetic field adjacent the detecting magnetometer of a control system for use in an airplane or other vehicle, and to provide that control system with a circuit which responds only to those changes in the magnetic field adjacent that magnetometer which occur at a rate which corresponds to the rate at which that magnetic field changes when the airplane or other vehicle passes over or near a magnetic object that causes an appreciable variation in the earth's magnetic field.

Other and further objects and advantages of the present invention should become apparent from an examination of the drawing and accompanying description.

In the drawing and accompanying description two preferred embodiments of the present invention are shown and described but it is to be understood that the drawing and accompanying description are for the purpose of illustration only and do not limit the invention and that the invention will be defined by the appended claims.

In the drawing, FIGS. 1A, 1B, 1C and 1D constitute a block diagram of one preferred form of control system that is made in accordance with the principles and teachings of the present invention.

Referring to the drawing in detail, the numeral 42 denotes a three-axis flux gate magnetometer which has three sensing elements; and one of those sensing elements in an X-axis sensing element 44, another of those sensing elements is a Y-axis sensing element 46, and the last of those sensing elements is a Z-axis sensing element 48.

Each of those sensing elements has two magnetic cores, a two-section excitation winding 50, a field nulling winding 52, and a field signal pickup winding 54.

The numerals 56, 58 and 60 denote field control panels which can be identical; and hence only the field control panel 56 will be described in detail. The numerals 62 and 64 denote the movable contacts of a selector switch within the field control panel 56; and those movable contacts are ganged together for conjoint movement. The movable contact 64 is connected directly to the lower terminal of the field nulling winding 52; and a resistor 47 and a potentiometer 45 connect the movable contact 62 to the upper terminal of that winding. A resistor 49 connects the movable contact of potentiometer 45 to one terminal of a D.C. microammeter 51 which has its zero setting at the center of the scale thereof; and the other terminal of that meter is connected to the movable contact 62. The scale of the meter 51 is preferably calibrated to represent milligauss. Adjacent the movable contact 62 is a set of three stationary contacts; and adjacent the movable contact 64 is a set of three stationary contacts. The uppermost contact in each set of three stationary contacts is not connected. The lowermost contacts in the two sets of three stationary contacts are, respectively, connected to jacks 66 and 68. The middle contact of the set of three stationary contacts adjacent the movable contact 64 is grounded. The middle contact of the set of three stationary contacts adjacent the movable contact 62 is connected to the movable contact of a potentiometer 72 by a resistor 70. The lower terminal of the potentiometer 72 is grounded, and the upper terminal of that potentiometer is connected to the movable contact of a single pole, double throw switch 74. The upper contact of the switch 74 is connected to the upper terminal of a potentiometer 94 by a junction 76; and the lower contact of the switch 74 is connected to the lower terminal of the potentiometer 94 by a junction 78. A resistor 96 connects the movable contact of the potentiometer 94 with a junction 98 adjacent the right-hand side of field control panel 56. Conductors 80 and 82 extend between the upper and lower ends, respectively, of the potentiometers 94 within the field control panels 56, 58 and 60 and a source of positive and negative regulated D.C. voltage, not shown. The field nulling windings 52 of the sensing magnetometer 42 are connected to the field control panels 56, 58 and 60 by pairs of conductors which extend from that sensing magnetometer to the left-hand sides of those field control panels, as those field control panels are viewed in FIG. 1A. The field signal pickup windings 54 of the sensing magnetometer 42 are connected, by pairs of conductors, to the grounded junction 102 and to the junctions 98 intermediate the right-hand sides of those field control panels and the left-hand sides of panels 210, 212 and 214.

Figure 3:
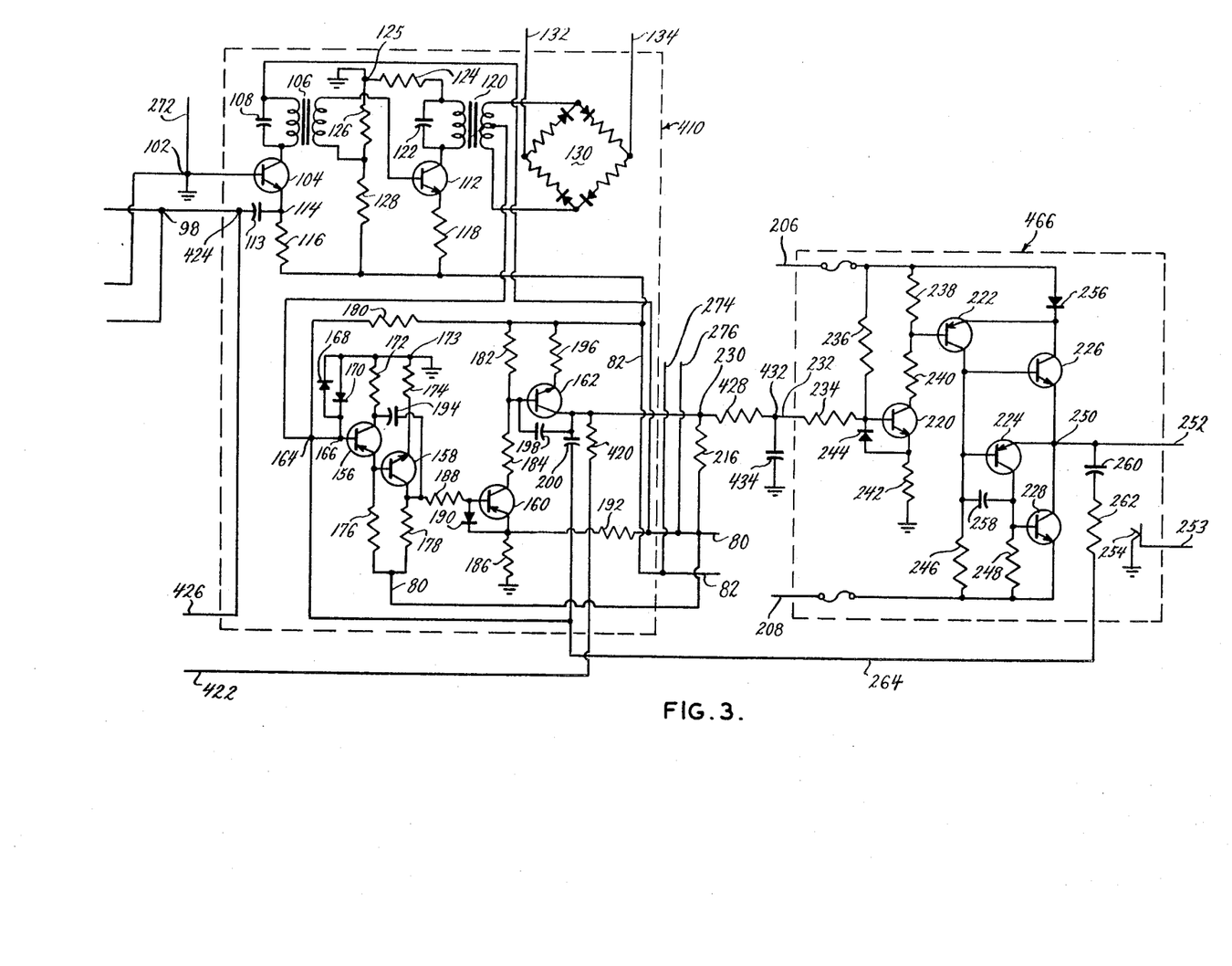
FIG. 3 is a schematic diagram of a panel and of a power amplifier which are used in the form of control system shown by FIGS. 1A, 1B, 1C and 1D.
Figure 3A:
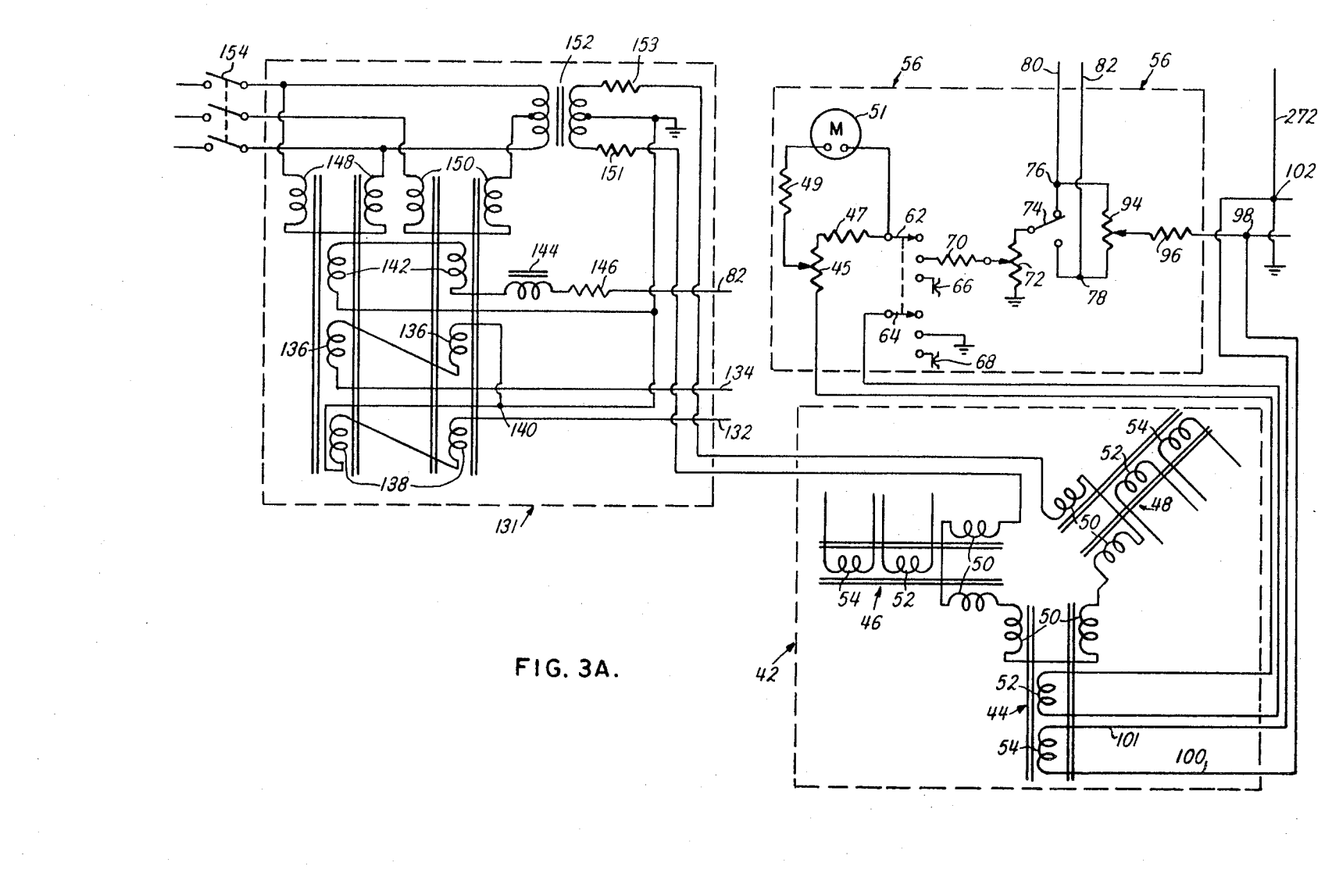
FIG. 3A is a schematic diagram of a magnetometer, a frequency double and a field control panel used in the form of control system shown by FIGS. 1A, 1B, 1C and 1D.

Each of the panels 210, 212 and 214 can be substantially identical to the panel 410 shown in FIG. 3, and thus can have an A.C. tuned amplifier, a magnetic demodulator, and a D.C. amplifier. The numerals 132 and 134 denote conductors which extend from the magnetic demodulators within the panels 210, 212 and 214 to a source of eight hundred cycle alternating current; and the magnetic frequency doubler 131 shown in FIG. 3A is a very useful source of such current. That magnetic frequency doubler has four magnetic cores and has windings 148 that are wound on two of the four magnetic cores; and those windings are connected in series and are connected across two phases of a three phase line. That frequency doubler also has windings 150 that are wound on the other two magnetic cores; and those windings are connected in series with each other and with the third phase of that three phase line and the center tap of the primary winding of a transformer 152. The outer terminals of that primary winding are connected to the said two phases of the three phase line.

One of the outer terminals of the center-tapped secondary winding of the transformer 152 is connected to the upper winding 50 of sensing element 46 by a resistor 151, while the other outer terminal of that center-tapped secondary winding is connected to the upper winding 50 of sensing element 48 by a resistor 153. The lower winding 50 of sensing element 46 is directly connected to the left-hand winding 50 of sensing element 44, while the right-hand winding 50 of the latter sensing element is directly connected to the lower winding 50 of sensing element 48. As a result, the windings 50 of the sensing elements 46, 44 and 48 are connected in series between the outer terminals of the secondary winding of transformer 152. The center tap of that secondary winding is grounded.

A three pole, single throw switch 154 can connect the three phase line to a suitable source of three-phase alternating current. In the said preferred embodiment of the present invention, the switch 154 selectively connects the three-phase line to a source of three-phase four hundred cycle alternating current.

The frequency doubler 131 also has bias windings 142; and those windings are connected in series. The lower terminal of the left-hand winding 142 is grounded, while the lower terminal of the right-hand winding 142 is connected to the negative terminal of the power supply by an inductor 144, a resistor 146, and the conductor 82.

Whenever the switch 154 is closed, the frequency doubler 131 will supply approximately fifty volts at eight hundred cycles per second to the ring 130 of the ring demodulator shown in FIG. 3; and the transformer 152 will supply four hundred cycles per second at low voltage to the windings 50 of the sensing elements 46, 44 and 48. The capacitor 108 and the primary winding of the transformer 106 in FIG. 3 coact to constitute a parallel-resonant circuit; and that circuit is tuned to resonate at eight hundred cycles per second. Similarly, the capacitor 122 and the primary winding of the transformer 120 in FIG. 3 coact to constitute a parallel-resonant circuit; and that circuit also is tuned to resonate at eight hundred cycles per second. This means that those resonant circuits are tuned to resonate at a harmonic of the alternating current supplied to the excitation windings 50 of the sensing elements 46, 44 and 48 of the magnetometer 42. The center tap of the secondary winding of the transformer 120 in FIG. 3 is connected to a junction 164.

The numeral 156 in FIG. 3 denotes a PNP transistor, the numeral 158 denotes an NPN transistor, the numeral 160 denotes a PNP transistor, and the numeral 162 denotes an NPN transistor. The base of the transistor 156 is connected to the center tap of the secondary winding of transformer 120 by a junction 166 and the junction 164. The emitter of that transistor is connected to the positive terminal of the power supply by a resistor 176 and the conductor 80; and the collector of that transistor is connected to ground by a resistor 172 and a junction 173. Back-to-back diodes 168 and 170 are connected between the base of transistor 156 and ground by the junctions 166 and 173.

The base of transistor 158 is connected to the upper terminal of the resistor 176; and the emitter of that transistor is connected to ground by a resistor 174 and junction 173. The collector of that transistor is connected to the positive terminal of the power supply by a resistor 178 and conductor 80.

The transistor 160 has the base thereof connected to the upper terminal of resistor 178 by a resistor 188. That base also is coupled to the lower terminal of resistor 172 by resistor 188 and a capacitor 194. The emitter of the transistor 160 is connected to a junction between a resistor 186 which is connected to ground a resistor 192 which is connected to the positive terminal of the power supply by conductor 80. A diode 190 has the anode thereof connected to the base of transistor 160 and has the cathode thereof connected to the emitter of that transistor. The collector of transistor 160 is connected to the negative terminal of the power supply by resistors 184 and 182 and conductor 82.

Transistor 162 has the base thereof connected to a junction intermediate the resistors 182 and 184, and it has the emitter thereof connected to the negative terminal of the power supply by a resistor 196 and conductor 82. The collector of that transistor is connected to the positive terminal of that power supply by a junction 230, a resistor 216, and conductor 80. A capacitor 198 is connected between the base and collector of transistor 162; and a capacitor 200 is connected between the collector of that transistor and the base of transistor 156 by junctions 164 and 166. A resistor 180 is connected between the junction 166 and the negative terminal of the power supply by junction 164 and by conductor 82.

The transistors 104 and 112, the transformers 106 and 120, the capacitors 108 and 122, and the resistors 116, 118, 124, 126 and 128 constitute a two-stage tuned A.C. amplifier. That amplifier is tuned to eight hundred cycles. The transistors 156, 158, 160 and 162, and the components associated therewith, constitute a D.C. amplifier. That two-stage A.C. tuned amplifier, the ring 130 of the magnetic demodulator, and that D.C. amplifier can be mounted on a panel; and that panel is denoted by the numeral 210. An identical panel 212 is provided for the sensing element 46, and an identical panel 214 is provided for the sensing element 48. Conductors 80 and 82 extend between the panels 210, 212 and 214 and the said regulated source of D.C. voltage. Resistors 216 have the lower terminals thereof connected to the conductors 80 and have the upper terminals thereof connected to conductors 232 by junctions 230. The conductors 232 extend between the panels 210, 212 and 214 and the said regulated source of D.C. voltage. Resistors 216 have the lower terminals thereof connected to the conductors 80 and have the upper terminals thereof connected to conductors 232 by junctions 230. The conductors 232 extend between the panels 210, 212 and 214 and power amplifiers 266, 268 and 270, respectively. The power amplifiers 266, 268 and 270 can be identical to the amplifier 466 in FIG. 3.

The numeral 220 in FIG. 3 denotes an NPN transistor, the numeral 222 denotes a PNP transistor, the numeral 224 denotes a PNP transistor, the numeral 226 denotes an NPN transistor, and the numeral 228 denotes an NPN transistor. The base of the transistor 220 is connected to the junction 230 by a resistor 234 and a conductor 232. The emitter of that transistor is connected to ground by a resistor 242. A diode 244 has the anode thereof connected to the emitter and has the cathode thereof connected to the base of that transistor. The collector of transistor 220 is connected to the positive terminal of the power supply by resistors 240 and 238 and conductor 206. The base of the transistor 220 also is connected to a junction between resistor 234 and a resistor 236, which is connected to that positive terminal of the power supply by conductor 206.

The base of the transistor 222 is connected to a junction between the resistors 238 and 240; and the emitter of that transistor is connected to the positive terminal of the power supply by a diode 256 and the conductor 206. The collector of that transistor is connected to the negative terminal of that power supply by a resistor 246 and conductor 208.

The base of the transistor 224 is connected to the upper terminal of resistor 246; and the emitter of that transistor is connected to ground via a junction 250, a conductor 252, spaced-apart-turns 11 and 13 which are connected in series a conductor 253, and a jack 254. The collector of that transistor is connected to the negative terminal of the power supply by a resistor 248 and conductor 208. A capacitor 258 is connected between the collector and the base of the transistor 224.

The base of the transistor 226 is connected to the upper terminal of resistor 246; and the emitter of that transistor is connected to ground via junction 250, conductor 252, spaced-apart turns 11 and 13, conductor 253, and jack 254. The collector of that transistor is connected to the positive terminal of the power supply by diode 256 and conductor 206. The base of the transistor 228 is connected to the upper terminal of resistor 248, and the emitter of that transistor is connected directly to the negative terminal of the power supply by conductor 208. The collector of that transistor is connected to ground via junction 250, conductor 252 spaced-apart turns 11 and 13 conductor 253 and jack 254. Junction 250 is connected to the base of transistor 156 by a capacitor 260, a resistor 262, a conductor 264, and junctions 164 and 166.

Figure 1A:
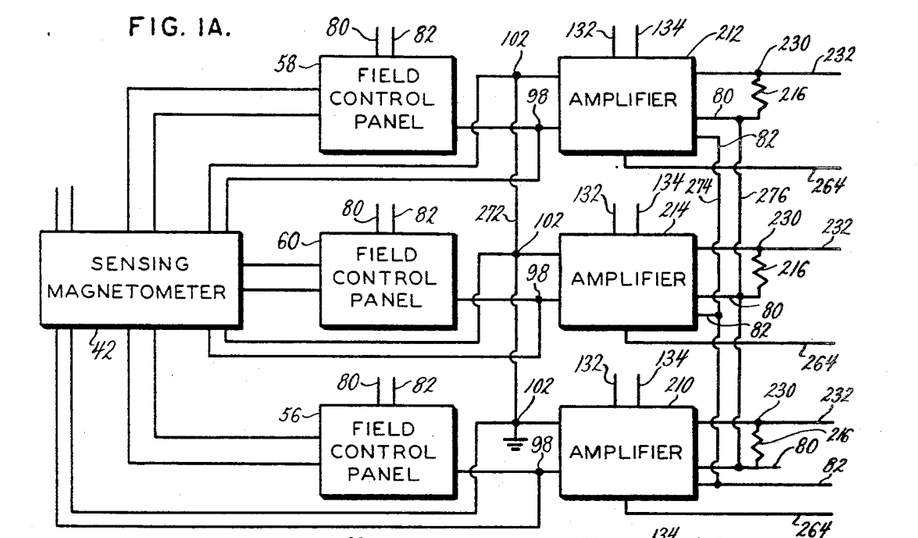
Figure 1B:
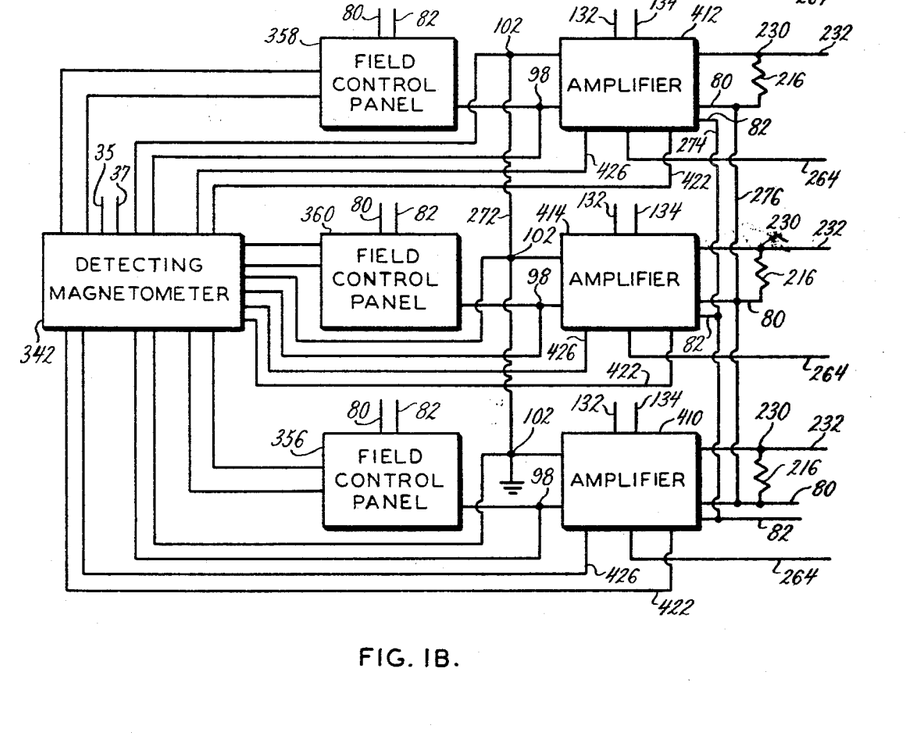
Figure 1C:
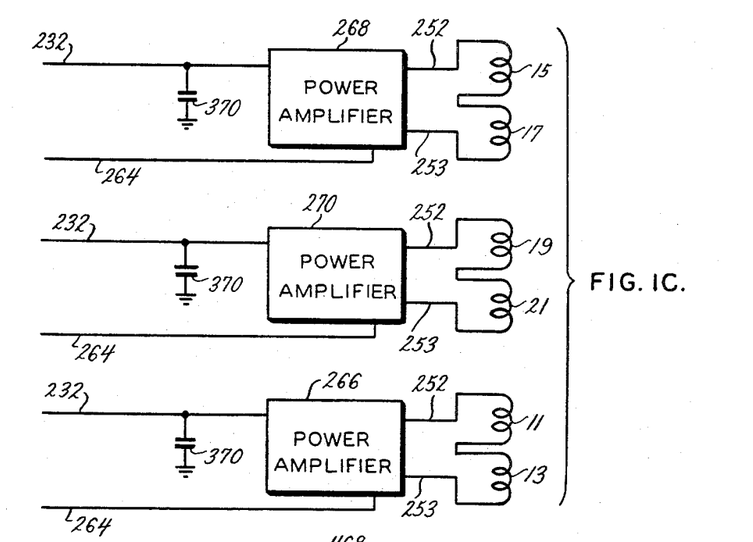
Figure 1D:
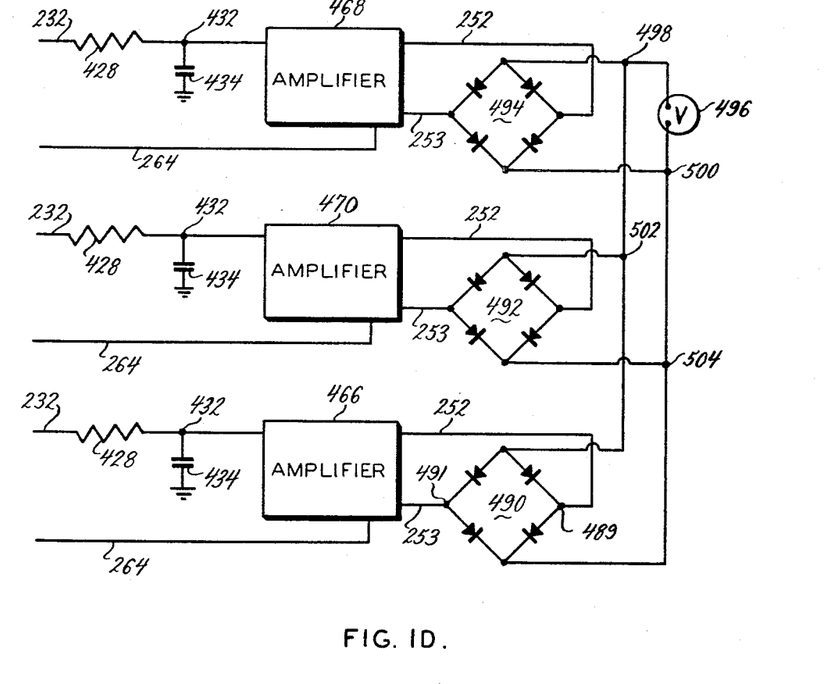
Figure 4:
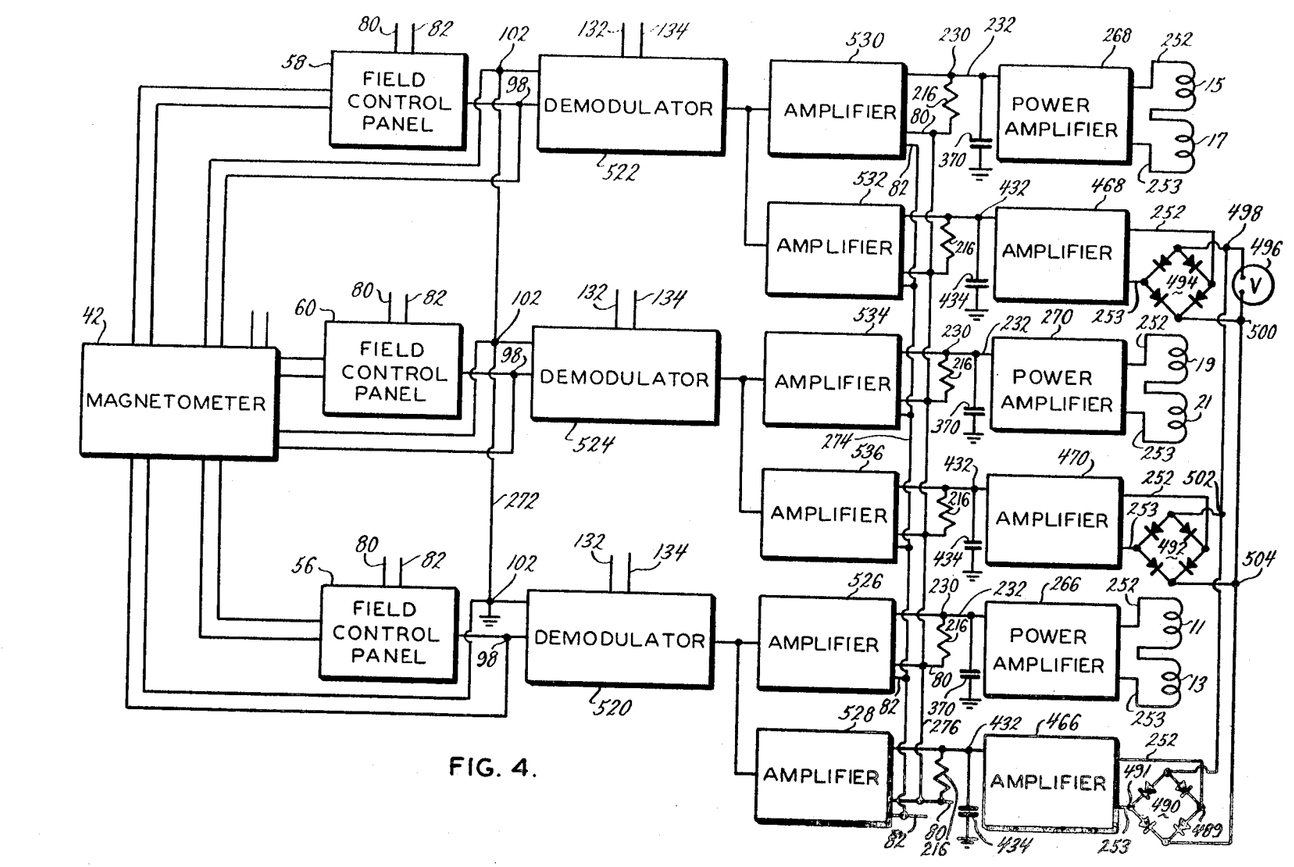
FIG. 4 is a block diagram of a second preferred form of control system that is made in accordance with the principles and teachings of the present invention.

The transistors 220, 222, 224, 226 and 228, and the components associated therewith, constitute a D.C. power amplifier which is generally denoted by the numeral 266 in FIGS. 1C and 4. Identical power amplifiers in FIGS. 1C and 4 are denoted by the numerals 268 and 270. The spaced-apart-turns 11 and 13 constitute a Helmholtz coil which defines an X-axis parallel to the X-axis sensing element of the sensing magnetometer 42. Spaced apart turns 15 and 17 are connected in series across the output of the power amplifier 268 by conductors 252 and 253; and those turns constitute a Helmholtz coil which defines a Y-axis parallel to the Y-axis sensing element of the sensing magnetometer 42. Spaced-apart turns 19 and 21 are connected in series across the output of the power amplifier 270 by conductors 252 and 253; and those turns constitute a Helmholtz coil which defines a Z-axis parallel to the Z-axis sensing element of the sensing magnetometer 42. The turns 11, 13, 15, 17, 19 and 21, and the Helmholtz coils which they constitute, define a space which is large enough to accommodate the sensing magnetometer 42 plus a detecting magnetometer.

A conductor 272 extends from the junction 102, adjacent the upper input of panel 210, to junctions adjacent the upper inputs of panels 212 and 214. As a result, all of those upper inputs will be at ground potential.

A conductor 274 connects the conductor 82 adjacent panel 210 with the conductors 82 adjacent the panels 212 and 214. Similary, a conductor 276 connects the conductor 80 adjacent panel 210 with the conductors 80 adjacent the panels 212 and 214. As a result, the voltages supplied to those panels by the conductors 80 and 82 will be substantially identical.

Whenever the movable contacts 62 and 64 of the field control panels 56, 58 and 60 are in their uppermost positions, the field nulling windings 52 of the sensing elements 44, 46 and 48 will be isolated from the rest of the circuit of the control system. Whenever the movable contacts 62 and 64 of the field control panels 56, 58 and 60 are in their lowermost positions, the field nulling windings 52 of the sensing elements 44, 46 and 48 will be connected to the jacks 66 and 68 of those field control panels; and those windings will respond to any voltages which are applied to those jacks. Whenever the movable contacts 62 and 64 of the field control panels 56, 58 and 60 are in their middle positions, the field nulling windings 52 of the sensing elements 44, 46 and 48 will be connected between ground and the left-hand terminals of the resistors 70 of the various field control panels.

The magnetometer 42 is shown as a second harmonic fluxgate magnetometer which has three sensing elements. The cores of those sensing elements are made from material which shows high permeability and saturation at low magnetizing field strength. The four hundred cycle alternating current which is supplied to the excitation windings 50 of the sensing elements 46, 44 and 48 by the transformer 152 will have sufficient amplitude to saturate the cores of those sensing elements.

Whenever the movable contact of potentiometer 94 of field control panel 56 is in its middle position, whenever the movable contacts 62 and 64 of that field control panel are in their uppermost positions, and whenever the sensing element 44 is substantially free of a unidirectional external component of magnetic force parallel to the axes of the magnetic cores thereof, the current flowing through the excitation windings 50 of that sensing element will induce equal but opposite voltages in the field signal pickup winding 54 of that sensing element; and hence the total output of that winding will be zero. With zero output from the winding 54, the emitter of transistor 104 will be more negative than the grounded base of that transistor; and hence that transistor will be conductive. The resulting flow of current through the primary winding of transformer 106 will be steady, and hence no voltage will be induced in the secondary winding of that transformer. With no voltage appearing across that secondary winding, the voltage at the junction between resistors 126 and 128, and hence the voltage at the base of transistor 112, will be less negative than the voltage at the emitter of that transistor; and, as a result, transistor 112 will be conductive. The resulting flow of current through the primary winding of transformer 120 will be steady, and hence no voltage will be induced in the secondary winding of that transformer. The frequency doubler 131 will be supplying eight hundred cycle alternating current to the ring 130 of the magnetic demodulator; but, with no signal from the signal transformer 120, the output of that magnetic demodulator will be zero.

Current will flow from the positive terminal of the power supply via conductor 80, resistor 176 in panel 210, the emitter-base circuit of transistor 156, junctions 166 and 164, resistor 180, and conductor 82 to the negative terminal of that power supply. The flow of current through that emitter-base circuit will be limited; but it will be sufficient to make transistor 156 conductive.

The resistance of resistor 180 is many times greater than the resistance of resistor 176, and hence the voltage at the top terminal of resistor 176—and at the base of transistor 158—will be positive and will be greater than the voltage at the emitter of that transistor. Consequently, that transistor will be conductive.

Current will flow from the positive terminal of the power supply via conductor 80, resistor 192 in panel 210, resistor 186, and ground to the grounded terminal of that power supply; and that flow of current will make the emitter of transistor 160 a couple of volts positive. The resistance of resistor 178 is many times greater than the resistance of resistor 192, and the resistance of resistors 174 and 186 are equal; and hence the current flowing through resistor 178, transistor 158, and resistor 174 will make the base of transistor 160 less positive than the emitter of that transistor. As a result, that transistor will be conductive.

The resulting flow of current through resistor 182 will make the base of transistor 162 positive relative to the emitter of that transistor. Consequently, the transistor 162 will be conductive.

Current will flow from the positive terminal of the power supply via conductor 206, resistor 236 of power amplifier 266, the base-emitter circuit of transistor 220, resistor 242, and ground to the grounded terminal of that power supply; and the flow of current in that base-emitter circuit will make that transistor conductive. The resulting voltage drop across resistor 238 will make the base of transistor 222 less positive than the emitter of that transistor; and hence that transistor will be conductive. The resulting voltage drop across resistor 246 will make the voltages at the base of transistors 244 and 226 close to ground level; and, since the emitters of those transistors are connected to ground via junction 250, conductor 252, turns 11 and 13 of the X-axis Helmholtz coil, conductor 253, and jack 254, those transistors will be substantially non-conductive. As long as the transistor 244 is substantially non-conductive, the voltage at the base of transistor 228 will be essentially twenty-four volts negative; and hence that transistor will be substantially non-conductive. This means that whenever the movable contact of potentiometer 94 of field control panel 56 is in its middle position, whenever the movable contacts 62 and 64 of that field control panel are in their uppermost positions, and whenever the sensing element 44 is substantially free of a unidirectional external component of magnetic force parallel to the axes of the magnetic cores thereof, substantially no current will flow through the X-axis Helmholtz coil. Similarly, whenever the movable contact of potentiometer 94 of field control panel 58 is in its middle position, whenever the movable contacts 62 and 64 of that field control panel are in their uppermost positions, and whenever the sensing element 46 is substantially free of a unidirectional, external component of force parallel to the axes of the magnetic cores thereof, substantially no current will flow through the Y-axis Helmholtz coil. Also, whenever the movable contact of potentiometer 94 of field control panel 60 is in its middle position, whenever the movable contacts 62 and 64 of that field control panel are in their uppermost positions, and whenever the sensing element 48 is substantially free of a unidirectional, external component of force parallel to the axes of the magnetic cores thereof, substantially no current will flow through the Z-axis Helmholtz coil.

Whenever a unidirectional, external component of magnetic force is applied to the sensing element 44 so it is parallel to the axes of the cores of that sensing element, that component of magnetic force will tend to magnetize both of those cores in the same direction, whereas the four hundred cycle alternating current in the excitation windings 50 will tend to magnetize one of those cores in that same direction while tending to magnetize the other of those cores in the opposite direction. The resulting phase-shift in the voltages induced in the field signal pickup winding 54 will develop an output voltage across that winding which primarily has a frequency of eight hundred cycles per second—the frequency to which the parallel-resonant circuits of the two-stage tuned A.C. amplifier are tuned.

That output voltage will recurrently make the emitter of the transistor 104 more negative and less negative relative to the grounded base of that transistor; and hence will recurrently increase and decrease the conductivity of that transistor. The resulting variations in the current flowing through the primary winding of transformer 106 will induce corresponding variations in the voltage across the secondary winding of that transformer. Those voltage variations will recurrently make the base of transistor 112 more positive and less positive relative to the emitter of that transistor; and hence will recurrently increase and decrease the conductivity of that transistor. The resulting variations in the current flowing through the primary winding of transforming 120 will induce an A.C. signal in the secondary winding of that transformer. That A.C. signal will have the same frequency as the reference current supplied by the frequecy doubler 131; and, depending upon the direction of the unidirectional, external component of magnetic force applied to the sensing element 44, that A.C. signal will be in phase with, or will be one hundred and eighty degrees out of phase with, that reference current.

If that A.C. signal is in phase with the reference current supplied by the frequency doubler 131, the voltage at the center tap of the secondary winding of transformer 120, and hence at the base of transistor 156, will be positive relative to ground. That voltage will cause the conductivity of transistor 156 to decrease, thereby causing the voltage at the base of transistor 158 to increase, and also causing the voltage at the collector of transistor 156 to decrease. The increased voltage at the base of transistor 158 will make that transistor more conductive; and the resulting increase in current flowing through resistor 178 will decrease the voltage at the collector of that transistor. The decrease in voltage at the collector of transistor 158 will be applied to the base of transistor 160 by resistor 188, and the decrease in voltage at the collector of transistor 156 will be coupled to the base of transistor 160 by capacitor 194 and resistor 188, and hence the transistor 160 will become more conductive. The resulting increase in the current flowing through resistor 182 will cause the voltage at the base of transistor 162 to become less negative; and, thereupon, that transistor will become more conductive.

The resulting increased voltage drop across resistor 216 will decrease the voltage at the base of transistor 220, thereby making that transistor less conductive. Less current will flow through resistor 238, and hence the base of transistor 222 will become more positive, and that transistor will become less conductive. The resulting decrease in voltage drop across resistor 246 will make the bases of transistors 224 and 226 more negative. Transistor 226 will continue to be substantially non-conductive, but transistor 224 will become conductive. The resulting increased voltage drop across resistor 248 will make the base of transistor 228 less negative; and hence that transistor will become conductive. Thereupon, current will flow from ground via jack 254, conductor 253, turns 13 and 11, conductor 252, junction 250, the collector-emitter circuit of transistor 228, conductor 208, and the negative terminal of the power supply. That current flow will cause the X-axis Helmholtz coil to develop a magnetic component of force which is parallel to the cores of the sensing element 42 and which will buck, and substantially null, the unidirectional, external magnetic component of force applied to the core of that sensing element.

If, on the other hand, the unidirectional external magnetic component of force applied to the cores of the sensing element 44 is in the opposite direction, the A.C. signal developed in the secondary winding of signal transformer 120 of the magnetic demodulator will be one hundred and eighty degrees out of phase with the reference current supplied by the frequency doubler 131. The voltage at the center tap of the secondary winding of transformer 120 will then be negative, rather than positive, relative to ground; and that voltage will make transistor 156 more conductive. The resulting increase in voltage drop across resistor 176 will make the base of transistor 158 less positive, and the resulting increase in voltage drop across resistor 172 will cause the voltage at the collector of transistor to increase. The decreased voltage at the base of transistor 158 will make that transistor less conductive; and the resulting decrease in current flowing through resistor 178 will increase the voltage at the collector of that transistor. The increase in voltage at the collector of transistor 158 will be applied to the base of transistor 160 by resistor 188, and the increase in voltage at the collector of transistor 156 will be coupled to the base of transistor 160 by capacitor 194 and resistor 188, and hence the transistor 160 will become less conductive. The resulting decrease in voltage drop across resistor 182 will cause the base of transistor 162 to become more negative, and hence will make that transistor less conductive.

The resulting decreased voltage drop across resistor 216 will increase the voltage at the base of transistor 220, thereby making that transistor more conductive. More current will flow through resistor 238, and hence the base of transistor 222 will become less positive, and that transistor will become more conductive. The resulting increase in voltage drop across resistor 246 will make the bases of transistors 224 and 226 positive as to ground. Transistor 224 will be non-conductive, but transistor 226 will become conductive. Because transistor 224 is non-conductive, the transistor 228 also will be non-conductive.

Current will flow from the positive terminal of the power supply via conductor 206, diode 256, transistor 226, junction 250, conductor 252, turns 11 and 13 of the X-axis Helmholtz coil, conductor 253, jack 254, and ground. That current flow will cause the X-axis Helmholtz coil to develop a magnetic component of force which is parallel to the cores of the sensing element 42 and which will buck, and substantially null, the unidirectional, external magnetic component of force applied to the cores of that sensing element.

This means that if a unidirectional, external magnetic component of force is applied to the cores of the sensing element 44 in one direction, the X-axis Helmholtz coil will develop a magnetic component of force which is parallel to but oppositely directed of that magnetic component of force, which is substantially equal to that magnectic component of force, and which will provide zero magnetic components of force at those cores along the X-axis thereof. On the other hand, if that unidirectional, external magnetic component of force is applied to the cores of the sensing element 44 in the opposite direction, the X-axis Helmholtz coil will develop a magnetic component of force which is parallel to but oppositely directed of that magnetic component of force, which is substantially equal to that magnetic component of force, and which will provide zero magnetic components of force at those cores along the X-axis thereof.

The sensing element 46, the panel 212, the power amplifier 268, and the turns 15 and 17 of the Y-axis Helmholtz coil will operate similarly when a unidirectional, external magnetic component of force is applied to the sensing element 46. Specifically, the Y-axis Helmholtz coil will develop a magnetic component of force at the magnetometer 42 which will buck and substantially null the unidirectional, external magnetic component of force applied to the sensing element 46. Also, the sensing element 48, the panel 214, the power amplifier 270, and the turns 19 and 21 of the Z-axis Helmholtz coil will operate similarly when a unidirectional, external magnetic component of force is applied to the sensing element 48. Specifically, the Z-axis Helmholtz coil will develop a magnetic component of force at the magnetometer 42 which will buck and substantially null the unidirectional, external magnetic component of force applied to the sensing element 48. Capacitors 370 are connected to the conductors 232, and the lower terminals of those capacitors are grounded, as shown by the drawing.

The numeral 342 denotes a detecting magnetometer which, together with the sensing magnetometer 42, is mounted in the space defined by the spaced-apart turns 11, 13, 15, 17, 19 and 21. As indicated particularly by FIG. 2, that detecting magnetometer is a three-axis flux gate magnetometer which has sensing elements 344, 346 and 348. Each of those sensing elements has two magnetic cores, has a two-section excitation winding 350, has a field nulling winding 352, has a field signal pickup winding 354, and has a feedback winding 355. The sensing element 344 has the axis thereof aligned with the X-axis defined by the Helmholtz coil constituted by the spaced turns 11 and 13. The sensing element 346 has the axis thereof alined with the Y-axis defined by the Helmholtz coil constituted by the spaced turns 15 and 17; and the sensing element 348 has the axis thereof alined with the Z-axis defined by the Helmholtz coil constituted by the spaced turns 19 and 21.

The numerals 356, 358 and 360 denote field control panels which can be identical to the field control panels 56, 58 and 60 of FIG. 1A. The field nulling winding 352 of the sensing element 344 is connected to the field control panel 356, the field nulling winding 352 of the sensing element 346 is connected to the field control panel 358, and the field nulling winding 352 of the sensing element 348 is connected to the field control panel 360. The conductors which connect those various field nulling windings to those various field control panels extend to the left-hand sides of those field control panels as shown by FIG. 1B. One terminal of each of the field signal pickup windings 354 of the sensing elements 344, 346 and 348 is connected to the grounded junction 102, while the other terminals of those windings are connected to junctions 98 which are intermediate panels 410, 412 and 414 and the field control panels 356, 358 and 360.

The panels 410, 412 and 414 are identical; and hence only one of those panels need be described in detail. As shown by FIG. 3, the numeral 104 in panel 410 denotes an NPN transistor; and the base of that transistor is directly connected to the junction 102 adjacent the left-hand side of that panel. The emitter of that transistor is connected to the junction 98, adjacent the left-hand side of that panel, by a junction 114, a capacitor 113, and a junction 424. That emitter also is connected to the regulated negative terminal of the power supply, not shown, by a resistor 116 and conductor 82. In addition, that emitter is connected to one terminal of the feedback winding 355 of the sensing element 344 of the detecting magnetometer 342 by junction 114, capacitor 113, junction 424, and conductor 426. The collector of that transistor is connected to the lower terminal of the primary winding of a transformer 106 and to the lower terminal of a capacitor 108. That capacitor and that primary winding are connected in parallel; and the upper terminals thereof are connected to the regulated positive terminal of the power supply by conductor 80. This means that the base of the transistor 104 is grounded, that the emitter of that transistor is connected to a regulated source of minus twenty-four volts by the resistor 116, and that the collector of that transistor is connected to a regulated source of plus twenty-four volts by the parallel-connected capacitor 108 and the primary winding of transformer 106.

The numeral 112 denotes an NPN transistor which has the base thereof connected ot the upper terminal of the secondary winding of the transformer 106. The primary and secondary windings of the transformer 106 are wound so the upper terminal of the secondary winding will be positive whenever the upper terminal of the primary winding is positive. The emitter of the transistor 112 is connected to the regulated negative terminal of the power supply by a resistor 118 and the conductor 82. The collector of that transistor is connected to ground by parallel-connected capacitor 122 and the primary winding of a transformer 120, by a resistor 124, and a junction 125. The lower terminal of the secondary winding of the transformer 106 is connected to ground by resistor 126 and junction 125, and that lower terminal is connected to the regulated negative terminal of the power supply by resistor 128 and conductor 82.

The transformer 120 acts as the signal transformer of a magnetic demodulator of standard and usual design; and a frequency doubler, not shown, which can be identical to the frequency doubler 131 in FIG. 3A acts as the reference transformer of that magnetic demodulator. The ring of that magnetic demodulator is denoted by the numeral 130; and each leg of that ring consists of a diode and a resistor. Two oppositely-disposed terminals of the ring 130 are directly connected to the upper and lower terminals of the secondary winding of transformer 120. One of the other two terminals of the ring 130 is connected to the frequency doubler by a conductor 134, while the second of the other two terminals of that ring is connected to that frequency doubler by a conductor 132.

Figure 2:
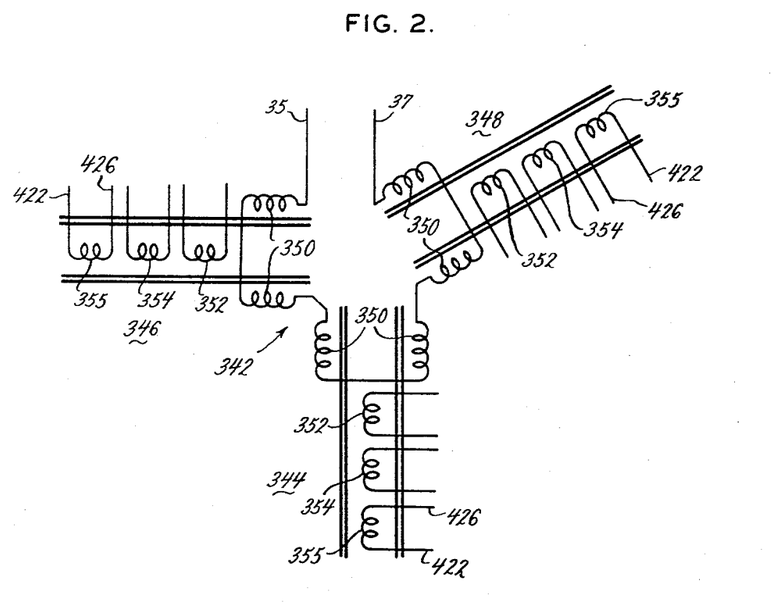
FIG. 2 is a schematic diagram of the detecting magnetometer which is used in the form of control system shown by FIGS. 1A, 1B, 1C and 1D.

The frequency doubler is preferably supplied with current from a source of four hundred cycle alternating current; and a transformer, not shown, couples that source to the excitation windings 350 of the sensing elements 344, 346 and 348 of the detecting magnetometer 342 by conductors 35 and 37. As indicated by FIG. 2, those excitation windings are connected in series with each other.

The frequency doubler will supply eight hundred cycle A.C. to the ring 130 of the ring demodulator; and the excitation windings 350 of the sensing elements 346, 344 and 348 of the detecting magnetometer 342 will be supplied with four hundred cycle A.C. The capacitor 108 and the primary winding of the transformer 106 coact to constitute a parallel-resonant circuit; and that circuit is tuned to resonate at eight hundred cycles per second. Similarly, the capacitor 122 and the primary winding of the transformer 120 coact to constitute a parallel-resonant circuit; and that circuit also is tuned to resonate at eight hundred cycles per second. This means that those resonant circuits are tuned to resonate at a harmonic of the alternating current supplied to the excitation windings 350 of the sensing elements 346, 344 and 348 of the detecting magnetometer 342. The center tap of the secondary winding of the transformer 120 is connected to a junction 164 which is disposed to the left of the ring 130.

The numeral 156 denotes a PNP transistor, the numeral 158 denotes an NPN transistor, the numeral 160 denotes a PNP transistor, and the numeral 162 denotes an NPN transistor. The base of the transistor 156 is connected to the center tap of the secondary winding of transformer 120 by junctions 166 and 164. The emitter of that transistor is connected to the regulated positive terminal of the power supply by a resistor 176 and the conductor 80; and the collector of that transistor is connected to ground by a resistor 172 and a junction 173. Back-to-back diodes 168 and 170 are connected between the base of transistor 156 and ground by the junctions 166 and 173.

The base of transistor 158 is connected to the upper terminal of the resistor 176; and the emitter of that transistor is connected to ground by a resistor 174 and junction 173. The collector of that transistor is connected to the regulated positive terminal of the power supply by a resistor 178 and conductor 80.

The transistor 160 has the base thereof connected to the upper terminal of resistor 178 by a resistor 188. That base also is coupled to the lower terminal of resistor 172 by resistor 188 and a capacitor 194. The emitter of the transistor 160 is connected to a junction between a resistor 186 which is connected to ground and a resistor 192 which is connected to the regulated positive terminal of the power supply by conductor 80. A diode 190 has the anode thereof connected to the base of transistor 160 and has the cathode thereof connected to the emitter of that transistor. The collector of transistor 160 is connected to the regulated negative terminal of the power supply by resistors 184 and 182 and conductor 82.

Transistor 162 has the base thereof connected to a junction intermediate the resistors 182 and 184, and it has the emitter thereof connected to the regulated negative terminal of the power supply by a resistor 196 and conductor 82. The collector of that transistor is connected to the other terminal of the feedback winding 355 of sensing element 344 of the detecting magnetometer 342 by a resistor 420 and a conductor 422. That collector also is connected to the regulated positive terminal of the power supply by a junction 230, a resistor 216, and conductor 80. A capacitor 198 is connected between the base and collector of transistor 162; and a capacitor 200 is connected between the collector of that transistor and the base of transistor 156 by junctions 164 and 166. A resistor 180 is connected between the junction 166 and the regulated negative terminal of the power supply by junction 164 and by conductor 82.

Transistors 104 and 112, transformers 106 and 120, capacitors 108 and 122, and resistors 116, 118, 124, 126 and 128 constitute a two-stage A.C. amplifier tuned to eight hundred cycles. Transistors 156, 158, 160 and 162, and the components associated therewith, constitute a D.C. amplifier. That A.C. amplifier, ring 130 of the magnetic demodulator, and that D.C. amplifier are mounted on panel 410.

Numeral 220 denotes an NPN transistor, numeral 222 denotes a PNP transistor, numeral 224 denotes a PNP transistor, numeral 226 denotes an NPN transistor and numeral 228 denotes an NPN transistor. The base of transistor 220 is connected to junction 230 by a resistor 234, a conductor 232, a junction 432, and a resistor 428, and also to an unregulated positive terminal of the power supply by a resistor 236. A diode 244 is connected between the emitter and base of that transistor; and that emitter is connected to ground by a resistor 242. The collector of that transistor is connected to the unregulated positive terminal of the power supply by resistors 240 and 238 and a conductor 206. A capacitor 434 is connected between ground and the junctions 432 which are The base of transistor 222 is connected between resistors 238 and 240; and the emitter thereof is connected to the unregulated positive terminal of the power supply by a diode 256 and conductor 206. The collector thereof is connected to an unregulated negative terminal of the power supply by a resistor 246 and a conductor 208.

The base of transistor 224 is connected to the upper terminal of resistor 246; and the emitter of that transistor is connected to input terminal 489 of a full wave bridge rectifier 490 by a conductor 252 and a junction 250. Input terminal 491 of bridge rectifier 490 is connected to ground by a conductor 253 and a jack 254. The collector of transistor 224 is connected to the unregulated negative terminal of the power supply by a resistor 248 and conductor 208. A capacitor 258 is connected between the collector and base of transistor 224.

The base of the transistor 226 is connected to the upper terminal of resistor 246; and the emitter of that transistor is connected to input terminal 489 of bridge rectifier 490 by the conductor 252. The collector of that transistor is connected to the unregulated positive terminal of the power supply by diode 256 and conductor 206. The base of the transistor 228 is connected to the upper terminal of resistor 248, and the emitter of that transistor is connected directly to the unregulated negative terminal of the power supply by conductor 208. The collector of that transistor is connected to input terminal 489 of bridge rectifier 490 by the conductor 252. Junction 250 is connected to the base of transistor 156 by a capacitor 260, a resistor 262, a conductor 264, and junctions 164 and 166.

The transistors 220, 222, 224, 226 and 228, and the components associated therewith, constitute a D.C. power amplifier which is generally denoted by the numeral 466. Identical D.C. power amplifiers 468 and 470, are, respectively, connected to the input terminals of full wave bridge rectifiers 494 and 492. The power amplifiers 466, 468 and 470 can be identical to the power amplifiers 266, 268 and 270 of FIG. 1C; but they will preferably develop considerably less power than will the power amplifiers 266, 268 and 270. Capacitors 434 are connected between ground the the junctions 432 which are intermediate the input resistors 234 of the amplifiers 468 and 470 and the resistors 428 adjacent the panels 412 and 414.

The output terminals of bridge rectifier 494 are connected to the terminals of an indicating device 496 by junctions 498 and 500. The output terminals of bridge rectifiers 490 and 492 are connected to the terminals of that indicating device by junctions 502 and 498 and junctions 504 and 500. The indicating device 496 can be a D.C. voltmeter, an oscilloscope, a recording voltmeter, or other voltage-responsive indicator.

A conductor 272 extends from the junction 102, adjacent the upper input of panel 410, to junctions adjacent the upper inputs of panels 414 and 412. As a result, all of those upper inputs will be at ground potential.

A conductor 274 connects the conductor 82, adjacent panel 410, with the conductors 82 adjacent the panels 414 and 412. Similarly, a conductor 276 connects the conductor 80, adjacent panel 410, with the conductors 80 adjacent the panels 414 and 412. As a result, the voltages supplied to those panels by the conductors 80 and 82 will be substantially identical.

The panels 410, 412 and 414 differ from the panels 210, 212 and 214 of FIG. 1A solely in having the junctions 424, the conductors 426, the resistors 420, and the conductors 422 which the panels 210, 212 and 214 do not have. Those junctions, those resistors, and those conductors enable the circuit of FIGS. 1A, 1B, 1C and 1D to supply negative feedback to the feedback windings 355 of the sensing elements 344, 346 and 348 of the detecting magnetometer 342. That negative feedback tends to "zero" the magnetic components of force adjacent the cores of the sensing elements 344, 346 and 348 of the detecting magnetometer 342.

The capacitors 370 coact primarily with the resistors 216 to form RC networks which serve to bypass to ground any signals that have waveforms comparable to the waveforms of signals having frequencies above a predetermined value; and, in the preferred form of control system shown by FIGS. 1A–3, that predetermined value is approximately one-half of a cycle per second. As a result, while the sensing magnetometer 42, the spaced-apart turns 11, 13, 15, 17, 19 and 21, and the circuit associated therewith in FIGS. 1A, 1B, 1C and 1D will, within the space defined by the Helmholtz coils, effectively null the earth's magnetic field and any gradual changes therein and will also effectively null any magnetic fields caused by D.C. generators and motors, that magnetometer, those turns, and that circuit will not null signals that have waveforms comparable to the waveforms of signals having frequencies above approximately one-half of a cycle per second. This means that the detecting magnetometer 342, which is disposed within the space defined by the spaced-apart turns, 11, 13, 15, 17, 19 and 21, will not be subject to the earth's magnetic field or any gradual changes therein and also will not be subject to any magnetic fields caused by D.C. generators and motors but will be directly subject to signals that have waveforms comparable to the waveforms of signals having frequencies above approximately one-half of a cycle per second.

The capacitors 434 coact with the input resistors of the amplifiers 466, 468 and 470 to form RC networks which by-pass to ground any signals that have waveforms comparable to the waveforms of signals having frequencies above a predetermined value; and, in the first preferred form of control system shown by the drawing, that predetermined value is approximately five cycles per second. This means that while the amplifiers 466, 468 and 470 will be able to receive and amplify signals that have waveforms comparable to the waveforms of signals having frequencies below approximately five cycles per second, signals that have waveforms comparable to the waveforms of signals having frequencies above approximately five cycles per second will be largely by-passed to ground.

The capacitors 434 and the input resistors 234 of the panels 410, 412 and 414 thus coact with the capacitors 370 and the resistors 216 to largely by-pass to ground all signals that have waveforms comparable to the waveforms of signals having frequencies above or below a given range of frequencies. The lower limit of that range of frequencies can be raised or lowered, as desired, by changing the values of the capacitors 370. Similarly, the upper limit of that range of frequencies can be raised or lowered, as desired, by changing the values of the capacitors 434. By selecting a range of frequencies which narrowly encompasses all authentic signals that should be developed by the detecting magnetometer 342, as the plane or other vehicle moves that magnetometer over or near a large magnetic object at a desired speed, it is possible to largely keep the indicating device 496 from responding to spurious signals.

The sensing magnetometer 42, the detecting magnetometer 342, and the Helmholtz coils will be fixedly mounted within the airplane or other vehicle; and the X-axis sensing element 344 of the detecting magnetometer 342 will be alined with the X-axis sensing element of the sensing magnetometer 42, and both of those sensing elements will be alined with the X-axis Helmholtz coils constituted by the turns 11 and 13. The Y-axis sensing element 346 of the detecting magnetometer 342 will be alined with the Y-axis sensing element of the sensing magnetometer 42, and both of those sensing elements will be alined with the Y-axis Helmholtz coil constituted by the turns 15 and 17; and the Z-axis sensing element 348 of the detecting magnetometer 342 will be alined with the Z-axis sensing element of the sensing magnetometer 42, and both of those sensing elements will be alined with the Z-axis Helmholtz coil constituted by the turns 19 and 21. The sensing magnetometer 42 and the detecting magnetometer 342 will be mounted within, and preferably close to the center of, the space defined by the X-axis, the Y-axis, and the Z-axis Helmholtz coils. The function and operation of the sensing magnetometer 42, of the X-axis, the Y-axis, and the Z-axis Helmholtz coils, and of the circuit connected thereto will be to eliminate from the space defined by the X-axis, the Y-axis, and the Z-axis Helmholtz coils all signals that have waveforms comparable to the waveforms of signals having frequencies below approximately one-half of a cycle per second. However, because the capacitors 370 are connected between the conductors 232 and ground, any signals which pass through the panels 210, 212 and 214 and which have waveforms comparable to the waveforms of signals having frequencies above approximately one-half of a cycle per second will be largely by-passed to ground. This means that the detecting magnetometer 342 will not be subject to the earth's magnetic field, to gradual changes in the earth's magnetic field, or to magnetic fields caused by D.C. motors and generators but will be directly subject to signals which have waveforms comparable to the waveforms of signals having frequencies above one-half of a cycle per second.

The airplane or other vehicle, in which the control system of the present invention is mounted, will preferably move at a speed that will enable the detecting magnetometer 342, the field control panels 356, 358 and 360, and the panels 410, 412 and 414 to respond to the presence of a large magnetic object to develop a signal which has a waveform comparable to the waveform of a signal having a frequency greater than one-half of a cycle per second but less than five cycles per second. With the first preferred embodiment of the present invention shown in the drawing, a speed of between one hundred and two hundred nautical miles per hour will enable the detecting magnetometer 342, the field control panels 356, 358 and 360, and the panels 410, 412 and 414 to develop such a signal. The movement of the airplane or other vehicle need not be along a straight line and need not be at a fixed altitude; and this is very desirable.

As the airplane or other vehicle passes over or near a large magnetic object, magnetic components of force will be developed parallel to the axis of one or more of the sensing elements of the sensing magnetometer 42; and the sensing circuit which includes the field control panels 56, 58 and 60 and the panels 210, 212 and 214 will develop a signal and apply it to the upper terminal of one or more of the capacitors 370. If the waveform of that signal is comparable to the waveform of a signal having a frequency above approximately one-half of a cycle per second, that signal will be largely by-passed to ground by one or more of the capacitors 370. As a result, that signal will not cause the power amplifiers 266, 268 and 270 and the Helmholtz coils to change the magnetic field adjacent the detecting magnetometer 342; and hence that magnetometer, the field control panels 356, 358 and 360, and the panels 410, 412 and 414 will develop a signal and apply it to the upper terminal of one or more of the capacitors 434. If the waveform of that signal is comparable to the waveform of a signal having a frequency above approximately five cycles per second, one or more of the capacitors 434 will largely by-pass that signal to ground; and, in that event, the amplifiers 466, 468 and 478 and the bridge rectifiers 490, 494 and 492 will not actuate the indicating device 496. However, if the waveform of that signal is comparable to the waveform of a signal having a frequency below approximately five cycles per second, the amplifiers 466, 468 and 478 and the bridge rectifiers 490, 494 and 492 will actuate the indicating device 496. The magnitude of the indication provided by the indicating device 496 will be a function of the size and intensity of the magnetic object detected by the detecting magnetometer 342.

The resistors 428 which are intermediate the panels 410, 412 and 414 and the amplifiers 466, 468 and 470, respectively, help to stabilize the overall circuit for the first preferred form of control system shown in the drawing. Those resistors will tend, to a limited extent, to reduce the gain of that overall circuit; but that overall circuit will have more than enough gain.

The mounting of the detecting magnetometer 342 within the space defined by the spaced-apart turns 11, 13, 15, 17, 19 and 21 is very important, because it obviates all need of holding the axis of any of the sensing elements of that magnetometer parallel to the earth's magnetic field. Further, it enables the sensing magnetometer 42, the Helmholtz coils, and the circuit associated therewith to provide a drift-free, dynamic and continuous nulling of the earth's magnetic field, of any slow changes in that magnetic field, of any magnetic fields caused by D.C. motors and generators, and of any signals which have frequencies less than approximately one-half of a cycle per second. This means that the first preferred form of control system provided by the present invention will not be subject to the problems and disadvantages inherent in the use of gimbal-mounted magnetometers and the servo motors and gear trains associated therewith. Furthermore, it means that the said form of control system will not be subject to the human errors that have been experienced with prior control systems wherein the earth's field was nulled adjacent the magnetometer by manual adjustment of a potentiometer.

Referring to FIG. 4, the numeral 42 denotes a sensing magnetometer which can be identical to the similarly-numbered magnetometer of FIG. 1A. That magnetometer has an X-axis sensing element, a Y-axis sensing element, and a Z-axis sensing element; and each of those sensing elements has two magnetic cores, a two-section excitation winding, a field nulling winding, and a field signal pickup winding. The field nulling windings of the varous sensing elements of the magnetometer 42 are connected to field control panels 56, 58 and 60, which can be identical to the similarly-numbered field control panels of FIG. 1A. Each field signal pickup winding of the magnetometer 42 has one of the terminals thereof connected to the grounded junctions 102, and has the other terminal thereof connected to one of the three junctions 98.

Demodulators 520, 522 and 524 have the inputs thereof connected to the grounded junctions 102 and to the junctions 98, as shown by FIG. 4. Those demodulators are identical; and hence only the demodulator 520 need be described in detail. That demodulator essentially consists of an A.C. tuned amplifier and a magnetic demodulator; and that A.C. tuned amplifier and that magnetic demodulator can be identical to the A.C. tuned amplifiers and magnetic demodulators of the panels 210, 212, and 214 of FIG. 1A. That A.C. tuned amplifier will differ from the A.C. tuned amplifiers of the panels 410, 412 and 414 of FIG. 1B in that it does not have the junction 424 or the conductor 426.

Figure 5:
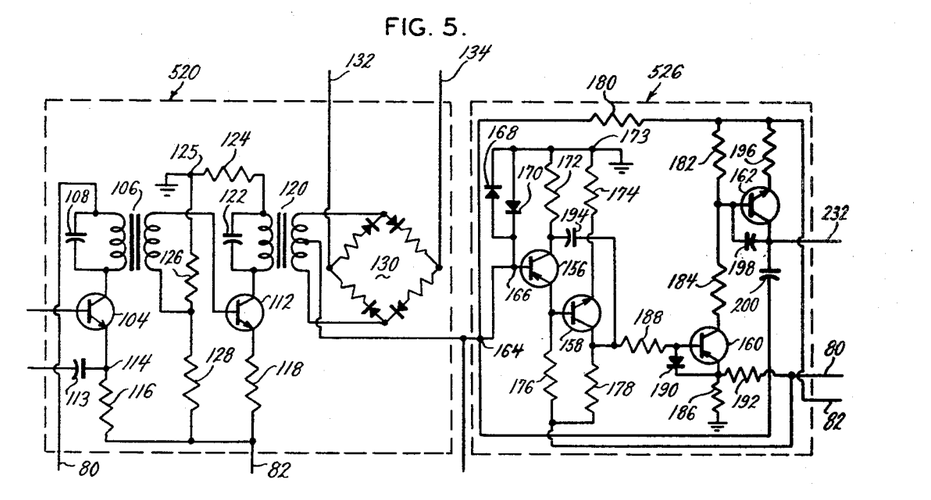
FIG. 5 is a schematic diagram of some of the panels which are used in the form of control system shown in FIG. 4.

The outputs of the demodulators 520, 522 and 524 are connected to the inputs of amplifiers 526, 528, 530, 532, 534 and 536; and, because those amplifiers can be identical, only one of those amplifiers is described in detail. As indicated by FIG. 5, that amplifier can be identical to the D.C. pre-amplifiers of the panels 210, 212 and 214 of FIG. 1A. The amplifier 526 differs from the D.C. pre-amplifiers of the panels 410, 412 and 414 of FIG. 1B in that it does not have the resistor 420 or the conductor 422.

The outputs of the amplifiers 526, 530 and 534 are connected to the inputs of power amplifiers 266, 268 and 270 by junctions 230 and conductors 232. The power amplifiers 266, 268 and 270 can be identical to the similarly-numbered power amplifiers of FIG. 1C. Capacitors 370 are connected intermediate the conductors 232 and ground; and those capacitors will coact primarily with the resistors 216 to by-pass to ground any signals which have waveforms comparable to the waveforms of signals having frequencies above approximately one-half of a cycle per second—all as described hereinbefore in connection with the control system shown by FIGS. 1A–3.

The output of the power amplifier 266 is connected to the serially-connected turns 11 and 13, the output of the power amplifier 268 is connected to the serially-connected turns 15 and 17, and the output of the amplifier 270 is connected to the serially-connected turns 19 and 21. As a result, the magnetometer 42, the field control panels 56, 58 and 60, the demodulators 520, 522 and 524, the amplifiers 526, 530 and 534, the capacitors 370, the power amplifiers 266, 268 and 270, and the Helmholtz coils associated therewith are the direct equivalents of the magnetometer 42, the field control panels 56, 58 and 60, the panels 210, 212 and 214, the capacitors 370, the power amplifiers 266, 268 and 270, and the Helmholtz coils of the control system shown by FIGS. 1A–3.

The outputs of the amplifiers 528, 532 and 536 are, respectively, connected to the inputs of amplifiers 466, 468 and 470 by junctions 432; and capacitors 434 are conneted between those junctions and ground. The output of the amplifier 466 is connected to the input terminals of a full wave bridge rectifier 490, the output of the amplifier 468 is connected to the input terminals of a full wave bridge rectifier 494, and the output of the amplifier 470 is connected to the input terminals of a full wave bridge rectifier 492. The output terminals of those full wave bridge rectifiers are connected to the terminals of an indicating device 496. The amplifiers 466, 468 and 470, the bridge rectifiers 490, 494 and 492, and the indicating device 496 can be identical to the similarly-numbered amplifiers, bridge rectifiers, and the indicating device of FIG. 1D.

The magnetometer 42, the field control panels 56, 58 and 60, the demodulators 520, 522 and 524, the amplifiers 528, 532 and 536, the amplifiers 466, 468 and 470, the bridge rectifiers 490, 494, and 492, the indicating device 496, and the capacitors 434 of FIG. 4 are the full equivalents of the magnetometer 342, the field control panels 356, 358 and 360, the panels 410, 412 and 414, the capacitors 434, the amplifiers 466, 468 and 470, the bridge rectifiers 490, 494 and 492, and the indicating device 496 of FIG. 4. The control system of FIG. 4 does not require the stabilizing resistors 428 of the control system of FIG. 1D. Also, the control system of FIG. 4 has materially fewer components than the control system of FIGS. 1A–3.

As the airplane or other vehicle passes over or near a large magnetic object, magnetic components of force will be developed parallel to the axis of one or more of the sensing elements of the sensing magnetometer 42; and the sensing circuit which includes the field control panels 56, 58 and 60, the demodulators 520, 522 and 524, and the amplifiers 526, 530 and 534 will develop a signal and apply it to the upper terminals of one or more of the capacitors 370. If the waveform of that signal is comparable to the waveform of a signal having a frequency above approximately one-half of a cycle per second, that signal will be largely by-passed to ground by one or more of the capacitors 370. As a result, that signal will not cause the power amplifiers 266, 268 and 270 and the Helmholtz coils to change the magnetic field adjacent the magnetic cores of the sensing magnetometer 42; and hence that magnetometer, the field control panels 56, 58 and 60, the demodulators 520, 522 and 524, the amplifiers 528, 532 and 536 will develop a signal and apply it to the upper terminal of one or more of the capacitors 434. If the waveform of that signal is comparable to the waveform of a signal having a frequency below approximately five cycles per second, the amplifiers 466, 468 and 470 and the bridge rectifiers 490, 494 and 492 will actuate the indicating device 496. The magnitude of the indication provided by the indicating device 496 will be a function of the size and intensity of the magnetic object detected by the magnetometer 42.

The magnetometer 42 performs a dual function in the sense that it serves as both a sensing magnetometer and a detecting magnetometer. The dual function of the magnetometer 42 is very important, because it obviates all need of holding the axis of any of the sensing elements of that magnetometer parallel to the earth's magnetic field. Further, it enables that magnetometer, the field control panels 56, 58 and 60, the demodulators 520, 522 and 524, the amplifiers 526, 530 and 534, the capacitors 370, the power amplifiers 266, 268 and 270, and the Helmholtz coils to provide a drift-free, dynamic and continuous nulling of the earth's magnetic field, of any slow changes in that magnetic field, of any magnetic fields caused by D.C. motors and generators, and of any signals which have frequencies less than approximately one-half of a cycle per second. This means that the second preferred form of control system provided by the present invention will not be subject to the problems and disadvantages inherent in the use of gimbal-mounted magnetometers and the servo motors and gear trains associated therewith. Furthermore, it means that the said form of control system will not be subject to the human errors that have been experienced with prior control systems wherein the earth's field was nulled adjacent the magnetometer by manual adjustment of a potentiometer.

In the control system of FIGS. 1A–3, the magnetometer 42, the Helmholtz coils, and the circuit associated therewith substantially null the earth's magnetic field within the space defined by those coils; and the detecting magnetometer 342 is mounted within that space. In the control system of FIG. 4, the field control panels 56, 58 and 60, the demodulators 520, 522 and 524, the amplifiers 526, 530 and 534, the capacitors 370, the power amplifiers 266, 268 and 270, and the Helmholtz coils coact with the magnetometer 42 to substantially null the earth's magnetic field adjacent the magnetic cores of the sensing elements of that magnetometer. In the former control system the magnetometer 42 serves as a sensing magnetometer and the magnetometer 342 serves as a detecting magnetometer; and the magnetometer 342 and the detecting circuit associated therewith are substantially insensitive to the earth's magnetic field, to slow changes in that magnetic field, to any magnetic fields caused by D.C. motors and generators, and to any signals which have frequencies less than approximately one-half of a cycle per second. In the latter control system, the magnetometer 42 serves as both a sensing magnetometer and a detecting magnetometer; and, in serving as a detecting magnetometer, that magnetometer and the detecting circuit associated therewith are substantially insensitive to the earth's magnetic field, to slow changes in that magnetic field, to any magnetic fields caused by D.C. motors and generators, and to any signals which have frequencies less than approximately one-half of a cycle per second.

The field control panels 56, 58 and 60 of FIGS. 1A and 4, could, if desired, be made much simpler. Specifically, the meters and meter resistors of those field control panels could be eliminated, the jacks of those field control panels could be eliminated, the selector switches of those field control panels could be eliminated, and at least one potentiometer in each of those field control panels could be eliminated. If desired other panels which performed the functions of the panels 210, 212 and 214 could be substituted for the panels 410, 412 and 414, for the demodulators 520, 522 and 524, and for the amplifiers 528, 532 and 536. The amplifiers 466, 468 and 470 have, for convenience of disclosure, been described as being essentially identical to the power amplifiers 266, 268 and 270 of the present invention. However, because the indicating device 496 requires virtually no power, the amplifiers 466, 468 and 470 can be made much smaller than the power amplifiers 266, 268 and 270. In fact, any D.C. amplifier performing the function of the power amplifier 266 could be substituted for any of the power amplifiers 266, 268 and 270 and for any of the amplifiers 466, 468 and 470. It should also be noted that in an appropriately-designed control system, the amplifiers 466, 468 and 470 could be eliminated.

In the control system of FIG. 4, the gain in the A.C. tuned amplifiers of the demodulators 520, 522 and 524 should be kept as small as possible. With such an arrangement, the amplification provided by the amplifiers 526, 530 and 534 should be equal to or greater than the amplification in the D.C. pre-amplifiers of the panels 210, 212 and 214 of FIG. 1A, and the amplification in the power amplifiers 266, 268 and 270 should be equal to or greater than the amplification in the similarly-numbered power amplifiers of FIG. 1C.

The detecting magnetometer 342 in FIGS. 1B, 2 and 4 has been shown as a three-axis flux gate magnetometer; and such a magnetometer is extremely useful and desirable. However, other types of magnetometers could be used. For example, a total field magnetometer could be used; and such a magnetometer would permit the recording of deviations in the total field vector which were due to the presence of large magnetic objects, whereas the three-axis flux gate magnetometer 342 of FIGS. 1B, 2 and 4 merely sums the individual components of the earth's magnetic field. To obtain a true deviation of the earth's magnetic field, when using a three-axis flux gate magnetometer, it is necessary to square the components, to add the squares of those components, and then to take the square root of the sum. When a total field magnetometer is used, such calculations are not necessary; and the deviation of the earth's magnetic field can be recorded directly. The circuit which would be used with a total field magnetometer would be of standard and usual form and would be readily apparent to those skilled in the art.

It will be noted that the control systems of the present invention are completely static and utilize components which are rugged and long-lived. This means that those control systems will be essentially trouble-free, will be able to withstand the stresses and strains imposed upon them by the movements of the airplane or other vehicle, and will have no mechanical inertia or time lag. Further, it will be noted that the control systems of the present invention can be used at any time and at any place in the world without any need of adjusting those control systems to meet local conditions. Moreover, no adjustments need be made to those control systems as the path followed by the airplane or other vehicle changes—irrespective of how rapidly that path changes or how frequently that path changes.

Different types of total field magnetometers are available; but those which could be adversely affected by vibration and by movement would not be particularly desirable. Consequently, if a total field magnetometer is to be substituted for the detecting magnetometer 342, that total field magnetometer should be of a type which is substantially unaffected by vibration or motion.

Whereas the drawing and accompanying description have shown and described two preferred embodiments of the present invention, it should be apparent to those skilled in the art that various changes may be made in the form of the invention without affecting the scope thereof.

What we claim is:

1. A control system that can detect the presence of a large magnetic body and that comprises:
   (a) a fluxgate sensing magnetometer that has an X-axis sensing element, a Y-axis sensing element, and a Z-axis sensing element,
   (b) an X-axis Helmholtz coil, a Y-axis Helmholtz coil, and a Z-axis Helmholtz coil,
   (c) said Helmholtz coils being spaced apart but coacting to define a space therebetween with said sensing magnetometer located within said space,
   (d) a circuit that connects said X-axis sensing element with said X-axis Helmholtz coil, that connects said Y-axis sensing element with said Y-axis Helmholtz coil, and that connects said Z-axis sensing element with said Z-axis Helmholtz coil, said sensing magnetometer, said circuit, and said Helmholtz coils being mountable in a vehicle that can move over an area to sense for the presence of large magnetic bodies,
   (e) said circuit including capacitors that attenuate signals developed by said sensing magnetometer having a frequency greater than approximately one-half of a cycle per second as said vehicle moves at a speed between one hundred and two hundred nautical miles per hour.
   (f) said circuit coacting with said sensing magnetometer and said Helmholtz coils to provide a drift-free dynamic and continuous nulling, within said space, of the earth's magnetic field, of any slow changes in that magnetic field, and of any signals having frequencies smaller than approximately one-half of a cycle per second,
   (g) a fluxgate detecting magnetometer having an X-axis sensing element, a Y-axis sensing element, and a Z-axis sensing element, said detecting magnetometer being located within said space,
   (h) the X-axis sensing elements of said sensing magnetometer and of said detecting magnetometer being parallel to each other and to the axis of said X-axis Helmholtz coil,
   (i) the Y-axis sensing elements of said sensing magnetometer and of said detecting magnetometer being parallel to each other and to the axis of said Y-axis Helmholtz coil,
   (j) the Z-axis sensing elements of said sensing magnetometer and of said detecting magnetometer being parallel to each other and to the axis of said Z-axis Helmholtz coil,
   (k) an indicator, and
   (l) a second circuit connected between said detecting magnetometer and said indicator,
   (m) said second circuit including capacitors that attenuate signals developed by said detecting magnetometer having a frequency greater than five cycles per second as said vehicle moves close to a large magnetic body at said speed.
   (n) said elements of said second circuit co-acting with said sensing magnetometer, said Helmholtz coils, and the first said circuit to keep signals, having frequencies below approximately one-half of a cycle per second and above five cycles per second, from actuating said indicator,
   (o) said detecting magnetometer, said second circuit, and said indicator being mountable in said vehicle.

2. A control system that can detect the presence of a large magnetic body and that comprises:
   (a) a sensing magnetometer that has an X-axis sensing element, a Y-axis sensing element, and a Z-axis sensing element,
   (b) an X-axis Helmholtz coil, a Y-axis Helmholtz coil, and a Z-axis Helmholtz coil,
   (c) said Helmholtz coils being spaced apart but coacting to define a space therebetween with said sensing magnetometer located within said space,
   (d) a circuit that connects said X-axis sensing element with said X-axis Helmholtz coil, that connects said Y-axis sensing element with said Y-axis Helmholtz coil, and that connects said Z-axis sensing element with said Z-axis Helmholtz coil, said sensing magnetometer, said Helmholtz coils, and said circuit being mountable in a vehicle that can move over an area to sense for the presence of large magnetic bodies, (e) said circuit including capacitors that attenuate signals developed by said sensing magnetometer having a frequency greater than the lower limit of a predetermined range of frequencies which should be developed as said vehicle moves close to a large magnetic body at a predetermined rate of speed.
(f) said circuit coacting with said sensing magnetometer and said Helmholtz coils to provide a drift-free dynamic and continuous nulling, within said space, of the earth's magnetic field, of any slow changes in that magnetic field, and of any signals having frequencies smaller than said lower limit frequency,
(g) a detecting magnetometer having an X-axis sensing element, a Y-axis sensing element, and a Z-axis sensing element,
(h) said detecting magnetometer being within said space,
(i) the X-axis sensing elements of said sensing magnetometer and of said detecting magnetometer being parallel to each other and to the axis of said X-axis Helmholtz coil,
(j) the Y-axis sensing elements of said sensing magnetometer and of said detecting magnetometer being parallel to each other and to the axis of said Y-axis Helmholtz coil,
(k) the Z-axis sensing elements of said sensing magnetometer and of said detecting magnetometer being parallel to each other and to the axis of said Z-axis Helmholtz coil,
(l) an indicator, and
(m) a second circuit connected between said detecting magnetometer and said indicator,
(n) said second circuit including capacitors that attenuate signals developed by said detecting magnetometer having a frequency greater than the upper limiter of said predetermined range of frequencies developed as said vehicle moves close to a large magnetic body at said predetermined rate of speed,
(o) said capacitors of said second circuit co-acting with said sensing magnetometer, said Helmholtz coils, and the first said circuit to keep signals having frequencies below said lower limit frequency and above the upper limit frequency, from actuating said indicator,
(p) said detecting magnetometer, said second circuit, and said indicator being mountable in said vehicle.

3. A control system that can detect the presence of a large magnetic body and that comprises:
(a) a sensing magnetometer,
(b) a plurality of coils that are spaced apart but co-act to define a space therebetween with said sensing magnetometer located within said space,
(c) a circuit that connects said sensing magnetometer with said coils, said sensing magnetometer, said circuit, and said coils being mountable in a vehicle that can move over an area to sense for the presence of large magnetic bodies,
(d) said circuit including elements that attenuate signals developed by said sensing magnetometer having a frequency greater than one-half of a cycle per second as said vehicle moves close to a large magnetic body at a speed between one hundred and two hundred nautical miles per hour,
(e) said circuit coacting with said sensing magnetometer and said coils to provide a drift-free dynamic and continuous nulling, within said space, of the earth's magnetic field, of any slow changes in that magnetic field, and of any signals having frequencies smaller than approximately one-half of a cycle per second,
(f) a detecting magnetometer within said space,
(g) an indicator, and
(h) a second circuit connected between said detecting magnetometer and said indicator,
(i) said second circuit including elements that attenuate signals developed by said detecting magnetometer having a frequency greater than five cycles per second as said vehicle moves close to a large magnetic body at said speed,
(j) said elements of said second circuit co-acting with said sensing magnetometer, said coils, and the first said circuit to keep signals, having frequencies below approximately one-half of a cycle per second and above five cycles per second from actuating said indicator,
(k) said detecting magnetometer, said second circuit, and said indicator being mountable in said vehicle.

4. A control system that can detect the presence of a large magnetic body and that comprises:
(a) a sensing magnetometer,
(b) a plurality of coils that are spaced apart but coact to define a space therebetween with said sensing magnetometer located within said space,
(c) a circuit that connects said sensing magnetometer with said coils, said sensing magnetometer, said coils and said circuit being mountable in a vehicle that can move over an area to sense for the presence of large magnetic bodies,
(d) said circuit including elements that attenuate signals developed by said sensing magnetometer having a frequency greater than the lower limit of a predetermined range of frequencies which should be developed as said vehicle moves close to a large magnetic body at a predetermined rate of speed,
(e) said circuit coacting with said sensing magnetometer and said coils to provide a drift-free dynamic and continuous nulling, within said space, of the earth's magnetic field, of any slow changes in that magnetic field, and of any signals having frequencies smaller than said lower limit frequency,
(f) a detecting magnetometer within said space,
(g) an indicator, and
(h) a second circuit connected between said detecting magnetometer and said indicator,
(i) said second circuit including elements that attenuate signals developed by said detecting magnetometer having a frequency greater than the upper limit of said predetermined range of frequencies developed as said vehicle moves close to a large magnetic body at said predetermined rate of speed,
(j) said elements of said second circuit co-acting with said sensing magnetometer, said coils, and the first said circuit to keep signals, having frequencies below said lower limit frequency and above the upper limit frequency, from actuating said indicator,
(k) said detecting magnetometer, said second circuit, and said indicator being mountable in said vehicle.

5. A control system that can detect the presence of a large magnetic body and that comprises:
(a) a sensing magnetometer,
(b) a plurality of coils that are spaced apart but coact to define a space therebetween with said sensing magnetometer located within said space,
(c) a circuit that connects said sensing magnetometer with said coils, said sensing magnetometer, said coils, and said circuit being mountable in a vehicle that can move over an area to sense for the presence of large magnetic bodies,
(d) said circuit coacting with said sensing magnetometer and said coils to provide a drift-free dynamic and continuous nulling, within said space, of the earth's magnetic field and of any slow changes in that magnetic field, said circuit including elements that attenuate signals developed by said sensing magnetometer having frequencies above a predetermined frequency,
(e) a detecting magnetometer within said space,
(f) an indicator, and
(g) a second circuit connected between said detecting magnetometer and said indicator, said second circuit including elements that attenuate signals developed by said detecting magnetometer having frequencies above a second predetermined frequency which frequency is higher than said first predetermined frequency, (h) said detecting magnetometer, said second circuit, and said indicator being mountable in said vehicle, (i) said sensing magnetometer having a plurality of sensing elements, (j) said detecting magnetometer having a plurality of sensing elements, (k) the sensing elements of said sensing and detecting magnetometers being aligned with each other.

6. A control system that can detect the presence of a large magnetic body and that comprises:
(a) a sensing magnetometer,
(b) a plurality of coils that are spaced apart but coact to define a space therebetween with said sensing magnetometer located within said space,
(c) a circuit that connects said sensing magnetometer with said coils, said sensing magnetometer, said coils, and said circuit being mountable in a vehicle that can move over an area to sense for the presence of large magnetic bodies,
(d) said circuit coacting with said sensing magnetometer and said coils to provide a drift-free dynamic and continuous nulling, within said space, of the earth's magnetic field and of any slow changes in that magnetic field, said circuit including elements that attenuate signals developed by said sensing magnetometer having frequencies above a predetermined frequency,
(e) a detecting magnetometer within said space,
(f) an indicator, and
(g) a second circuit connected between said detecting magnetometer and said indicator, said second circuit including elements that attenuate signals developed by said detecting magnetometer having frequencies above a second predetermined frequency which frequency is higher than said first predetermined frequency,
(h) said detecting magnetometer, said second circuit, and said indicator being mountable in said vehicle.

7. A control system that can detect the presence of a large magnetic body and that comprises:
(a) a magnetometer that has an X-axis sensing element, a Y-axis sensing element, and a Z-axis sensing element,
(b) an X-axis Helmholtz coil, a Y-axis Helmholtz coil, and a Z-axis Helmholtz coil,
(c) said Helmholtz coils being spaced apart but coacting to define a space therebetween with said magnetometer located within said space,
(d) a circuit that connects said X-axis sensing element with said X-axis Helmholtz coil, that connects said Y-axis sensing element with said Y-axis Helmholtz coil, and that connects said Z-axis sensing element with said Z-axis Helmholtz coil, said magnetometer, said circuit, and said Helmholtz coils being mountable in a vehicle that can move over an area to sense for the presence of large magnetic bodies,
(e) said circuit including capacitors that attenuate signals developed by said magnetometer having a frequency greater than approximately one-half of a cycle per second as said vehicle moves at a speed between one hundred and two hundred nautical miles per hour,
(f) said circuit coacting with said magnetometer and said Helmholtz coils to provide a drift-free dynamic and continuous nulling, within said space, of the earth's magnetic field, of any slow changes in that magnetic field, and of any signals having frequencies smaller than approximately one-half of a cycle per second,
(g) an indicator, and
(h) a second circuit connected between said magnetometer and said indicator, (i) said second circuit including capacitors that attenuate signals developed by said magnetometer having a frequency greater than five cycles per second as said vehicle moves close to a large magnetic body at said speed,
(j) said elements of said second circuit coacting with said magnetometer, said Helmholtz coils, and the first circuit to keep signals, having frequencies below approximately one-half of a cycle per second and above five cycles per second, from actuating said indicator,
(k) said magnetometer performing the dual functions of a sensing magnetometer and a detecting magnetometer,
(l) the first said and said second circuits having some parts in common.

8. A control system that can detect the presence of a large magnetic body and that comprises:
(a) a magnetometer that has a plurality of sensing elements,
(b) a plurality of coils that are spaced apart but coact to define a space therebetween with said magnetometer located within said space,
(c) a circuit that connects said sensing elements of said magnetometer with said coils, said magnetometer, said coils, and said circuit being mountable in a vehicle that can move over an area to sense for the presence of large magnetic bodies,
(d) said circuit including elements that attenuate signals developed by said magnetometer having a frequency greater than the lower limit of a predetermined range of frequencies which should be developed as said vehicle moves close to a large magnetic body at a predetermined rate of speed,
(e) said circuit coacting with said magnetometer and said coils to provide a drift-free dynamic and continuous nulling, within said space, of the earth's magnetic field, of any slow changes in that magnetic field, and of any signals having frequencies smaller than said lower limit frequency,
(f) an indicator, and
(g) a second circuit connected between said magnetometer and said indicator,
(h) said second circuit including elements that attenuate signals developed by said magnetometer having a frequency greater than the upper limit of said predetermined range of frequencies developed as said vehicle moves close to a large magnetic body at said predetermined rate of speed,
(i) said elements of said second circuit coacting with said magnetometer, said coils, and the first said circuit to keep signals, having frequencies below said lower limit frequency and above the upper limit frequency, from actuating said indicator,
(j) said magnetometer performing the dual functions of a sensing magnetometer and a detecting magnetometer.

9. A control system that can detect the presence of a large magnetic body and that comprises:
(a) a magnetometer,
(b) a plurality of coils that are spaced apart but coact to define a space therebetween with said magnetometer located within said space,
(c) a circuit that connects said magnetometer with said coils, said magnetometer, said coils, and said circuit being mountable in a vehicle that can move over an area to sense for the presence of large magnetic bodies,
(d) said circuit including elements that attenuate signals developed by said magnetometer, having a frequency greater than the lower limit of a predetermined range of frequencies which should be developed as said vehicle moves close to a large magnetic body at a predetermined rate of speed,
(e) said circuit coacting with said magnetometer and said coils to provide a drift-free dynamic and continuous nulling, within said space, of the earth's magnetic field, of any slow changes in that magnetic field, and of any signals having frequencies smaller than said lower limit frequency,
(f) an indicator, and
(g) a second circuit connected between said magnetometer and said indicator, said second circuit including elements that attenuate signals developed by said magnetometer having a frequency greater than the upper limit of said predetermined range of frequencies developed as said vehicle moves close to a large magnetic body at a predetermined rate of speed,
(h) said second circuit coacting with said magnetometer, said coils, and the first said circuit to keep signals, having frequencies below the lower limit frequency and above the upper limit frequency, from actuating said indicator.

10. A control system that can detect the presence of a large magnetic body and that comprises:
(a) a plurality of coils that are spaced apart but coact to define a space therebetween,
(b) means connected to said coils to supply signals to said coils enabling said coils to dynamically and continuously null, within said space, the earth's magnetic field, any slow changes in that magnetic field, and any signals having a frequency smaller than the lower limit of a predetermined range of frequencies which should be developed by a magnetometer disposed in a vehicle moving close to a large magnetic body at a speed between one hundred and two hundred nautical miles per hour,
(c) a detecting magnetometer disposed within said space,
(d) an indicator, and
(e) a circuit connected between said detecting magnetometer and said indicator, said means, said detecting magnetometer, said indicator and said coils being mountable in a vehicle that can move over an area to sense for the presence of large magnetic bodies,
(f) said circuit including elements that attenuate signals developed by said detecting magnetometer having a frequency greater than the upper limit of said predetermined range of frequencies developed as said vehicle moves close to a large magnetic body at a speed between one hundred and two hundred nautical miles per hour,
(g) said elements of said circuit coacting with the nulling, within said space, of the earth's magnetic field and any slow changes in that magnetic field and any signals having a frequency below said lower limit to keep signals, having frequencies below and above said range of frequencies from actuating said indicator,
(h) the upper limit of said frequency range being approximately five cycles per second, and the lower limit being one half of a cycle per second,
(i) said detecting magnetometer being part of said means, whereby said detecting magnetometer performs a dual function.

11. A control system that can detect the presence of a large magnetic body and that comprises:
(a) a plurality of coils that are spaced apart but coact to define a space therebetween,
(b) means connected to said coils to supply signals to said coils enabling said coils to dynamically and continuously null, within said space, the earth's magnetic field, any slow changes in that magnetic field and any signals having a frequency smaller than the lower limit of a predetermined range of frequencies which should be developed in a magnetometer disposed in a vehicle moving close to a large magnetic body at a predetermined speed,
(c) a detecting magnetometer disposed within said space,
(d) an indicator, and
(e) a second means connected between said detecting magnetometer and said indicator, said detecting magnetometer, said first means, said indicator and said coils being mountable in a vehicle that can move over an area to sense for the presence of large magnetic bodies,
(f) said second means coacting with the nulling, within said space, of the earth's magnetic field, any slow changes in that magnetic field and any signals having a frequency below said lower limit to keep signals, having frequencies below and above the range of frequencies developed by said detecting magnetometer as said vehicle moves close to a large magnetic body at a predetermined speed, from actuating said indicator,
(g) the lower end of said frequency range being approximately one-half of a cycle per second,
(h) said detecting magnetometer being part of said first means, whereby said detecting magnetometer performs a dual function.

12. A control system that can detect the presence of a large magnetic body and that comprises:
(a) a plurality of coils that are spaced apart but coact to defined a space therebetween,
(b) means connected to said coils to supply signals to said coils enabling said coils to dynamically and continuously null, within said space, the earth's magnetic field, any slow changes in that magnetic field and any signals having a frequency smaller than the lower limit of a predetermined range of frequencies which should be developed in a magnetometer disposed in a vehicle moving close to a large magnetic body at a predetermined speed,
(c) a detecting magnetometer disposed within said space,
(d) an indicator, and
(e) a second means connected between said detecting magnetometer and said indicator, said first means, said detecting magnetometer, said indicator and said coils being mountable in a vehicle that can move over an area to sense for the presence of large magnetic bodies,
(f) said second means coacting with the nulling, within said space, of the earth's magnetic field, any slow changes in the magnetic field and any signals having a frequency below said lower limit to keep signals, having frequencies below and above the range of frequencies developed by said detecting magnetometer as said vehicle moves close to a large magnetic body at a predetermined speed, from actuating said indicator.

References Cited
UNITED STATES PATENTS 2,696,602  12/1954  Evans _________________ 324—8

RUDOLPH V. ROLINEC, *Primary Examiner.*

R. J. CORCORAN, *Assistant Examiner.*

UNITED STATES PATENT OFFICE
CERTIFICATE OF CORRECTION

Patent No. 3,398,360                      August 20, 1968

Joseph L. Behr et al.

It is certified that error appears in the above identified patent and that said Letters Patent are hereby corrected as shown below:

Column 2, line 13, "nearbly" should read -- nearby --. Column 5, line 33, cancel "and the said regulated"; line 34, beginning with "source" cancel all to and including "212 and 214" in line 38, same column 5. Column 7, lines 66 and 72, "244", each occurrence, should read -- 224 --. Column 9, line 30, "core" should read -- cores --; line 45, after "transistor" insert -- 156 --. Column 11, line 4, "oue" should read -- one --. Column 13, line 7, "432 which are" should read -- 432. --; line 49, "the", first occurrence, should read -- and --. Column 21, line 35, "limiter" should read -- limit --.

Signed and sealed this 17th day of March 1970.

(SEAL)
Attest:

EDWARD M. FLETCHER, JR.
Attesting Officer

WILLIAM E. SCHUYLER, JR.
Commissioner of Patents